DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED DECEMBER 2, 1975

941 O.G. 7

T941,009

FORMATION OF MICRODISCONTINUOUS CHROMIUM

Donald L. Snyder, Solon, and Arthur H. Du Rose, Richmond Heights, Ohio, assignors to Kewanee Oil Company, Bryn Mawr, Pa.

Filed Dec. 20, 1973, Ser. No. 426,765
Int. Cl. B32b *15/00;* C23b *5/50*
U.S. Cl. 29—194
No Drawing. 20 Pages Specification

A method is described for producing a microporous chromium electrodeposit on a basis metal of nickel, cobalt, or an alloy containing one or both, by depositing electrically conductive metallic particles on the basis metal. The fine particles may be grown directly on the surface of the basis metal by plating from an electroplating bath, by immersion coating from an aqueous solution, or by the reduction from an electroless bath. In each case, the ions of the metallic particles to be deposited are present in the bath. Alternatively, the metal particles are deposited on the basis metal in a strike layer from an electroplating bath containing the particles in finely divided form. The basis metal, containing the discrete fine particles, is then plated with a thin layer of chromium in a conventional manner to yield a microporous chromium deposit.